Figure 5:
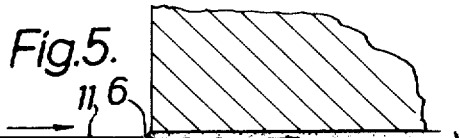

United States Patent [19]

Stirling et al.

[11] 3,913,764

[45] Oct. 21, 1975

[54] MECHANICAL HANDLING OF GOODS

[76] Inventors: James Alexander Stirling, 31 Fordwich Road, Welwyn Garden City, Herts; Gordon Carlton, Bambergers Pallets & Cases Ltd., St. Cross St., London, both of England

[22] Filed: Mar. 30, 1973

[21] Appl. No.: 346,331

Related U.S. Application Data

[62] Division of Ser. No. 150,011, June 4, 1971, Pat. No. 3,790,010.

[52] U.S. Cl. ............................... 214/621; 108/51
[51] Int. Cl. ...................... B65g 1/14; B65g 7/02
[58] Field of Search ...... 214/8.5 SS, 10.5 R, 10.5 D, 214/620, 621; 108/51, 53, 57, 58

[56] References Cited
UNITED STATES PATENTS

| | | | |
|---|---|---|---|
| 2,302,137 | 11/1942 | Neuman | 214/10.5 R X |
| 2,328,397 | 8/1943 | Neuman | 214/10.5 R |
| 2,854,150 | 9/1958 | Shea | 214/8.5 SS |
| 3,007,663 | 11/1961 | Huck | 108/57 |
| 3,090,505 | 5/1963 | Mead et al. | 214/8.5 SS |
| 3,318,473 | 5/1967 | Jones et al. | 108/58 X |
| 3,381,937 | 5/1968 | Zillman | 214/8.5 SS X |
| 3,429,469 | 2/1969 | Peterson | 214/8.5 SS X |
| 3,440,976 | 4/1969 | Burne | 108/51 |

*Primary Examiner*—Robert J. Spar
*Assistant Examiner*—Leslie J. Paperner

[57] ABSTRACT

This invention provides an apparatus for the mechanical handling of goods in which the goods are stacked upon a flat flexible pallet, in the form of an envelope with a mouth at one end, which takes up very little space and which will not support the goods when the goods are to be moved. To lift the goods the pallet is partially inflated through the mouth by blowing air into the envelope and a rigid supporting member is introduced into the envelope through the mouth so that the goods can be lifted, moved and put down again whereupon the supporting member can be removed and the air supply turned off so that the pallet lies flat again.

9 Claims, 7 Drawing Figures

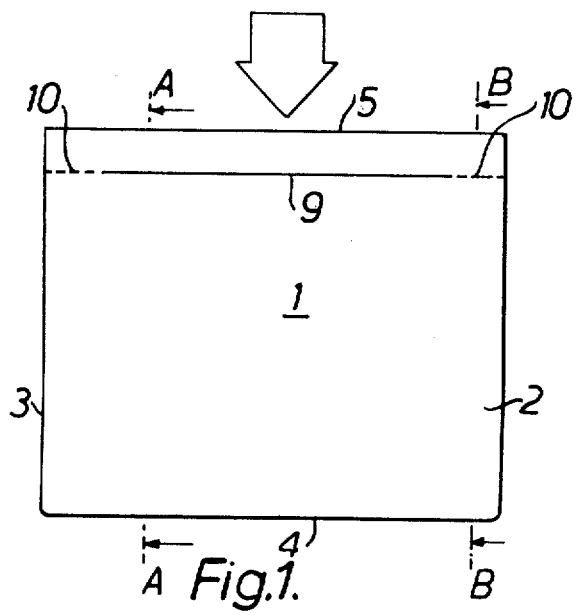
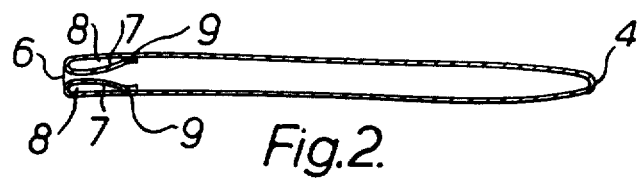
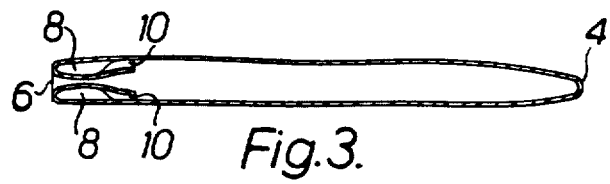
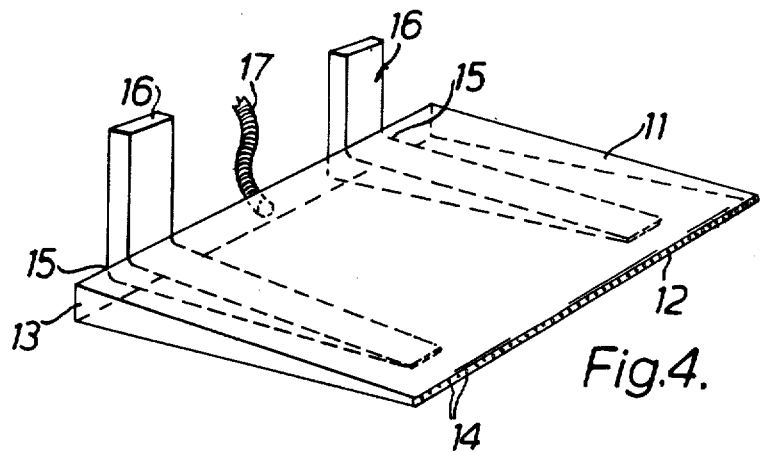

MECHANICAL HANDLING OF GOODS

RELATED APPLICATION

This is a division of application Ser. No. 150,011 filed June 4, 1971, now U.S. Pat. No. 3,790,010.

This invention is concerned with the provision of an improved apparatus for the mechanical handling of goods.

In accordance with present techniques for the mechanical handling of goods the goods are very often stacked on pallets and fork lift trucks are used to convey the palletized goods from one location to another. Further than that pallets are very often used in the storage of goods and also during the transport of goods. Pallets as at present constructed are effective but they do suffer from some disadvantages; for example ideally a rigid pallet should be constructed and designed for the pay load which it is to support but a major restriction in the design of a rigid pallet is that it must be capable of withstanding a superimposed load in any stacking situation which may be three or even four times greater than the pay load of an individual pallet.

Another disadvantage with known rigid pallets is that the pallot itself takes up considerable space. For example a conventional pallet of standard 40×48 inch size would take up a volume of about 7 cubic feet on the average and that represents wasted storage space which otherwise could be used to store goods.

It is therefore an object of the present invention to provide an improved apparatus for the mechanical handling of goods.

The invention therefore includes as an important feature the provision of a special form of envelope to receive a spade for use in the handling system described above.

In accordance with the present invention there is provided an apparatus for the mechanical handling of goods which comprises stacking the goods upon a flexible pallet in the form of an envelope which normally lies substantially flat and which is, of itself, incapable of supporting the goods and introducing a rigid separator member capable of supporting the goods into the envelope when it is desired to move the goods.

The invention also includes an apparatus for the mechanical handling of goods which comprises stacking the goods upon the upper surface of an inflatable flexible envelope which is open at least at one end to form a mouth and which forms a pallet which normally lies substantially flat, introducing a relatively rigid separator member into the mouth of the envelope, directing gas under pressure into the envelope so that it becomes partially inflated, inserting the separator member substantially fully into the envelope, and then using the separator and the envelope together as a pallet on which to move the goods.

Therefore in accordance with an important feature of the present invention we provide a pallet in the form of an envelope comprising two layers of material which normally lie substantially flat and between which a rigid separator member may be inserted when it is desired to move goods stacked upon the envelope. The envelope has an upper and a lower layer or member of thin material interconnected to one another and provided with an opening or openings to receive the separator member.

The two layers may consist of relatively inflexible material such as plywood or metal interconnected by flexible connecting means such as a suitable plastics material which is inherently flexible or by a bellows type connection so that the envelope can open out or expand to receive the spade. Alternatively we may use an envelope having a relatively inflexible lower layer, e.g., of plywood or metal and a relatively flexible upper layer, e.g., of plastics material such as polythene which may be secured to the lower layer in any convenient manner with an opening or openings to permit the insertion of the spade. As a further alternative we may use an envelope comprising two flexible layers which may be formed by folding a single sheet of plastics material upon itself.

The underlying idea of the invention is to ensure that the pallet will be substantially flat and in a collapsed condition when the separator is not in its operative position so that very little space is taken up and that the pallet can be opened out somewhat to receive the separator. Opening out of the envelope to receive the separator is preferably effected by the use of compressed gas or gas under pressure, e.g., compressed air from a compressor or air under pressure from some kind of fan or blower and hereinafter for convenience we shall refer simply to compressed air or gas which we shall use in a general sense to refer to a moving stream of gas such as air. Alternatively we may use hydraulic pressure such as oil under pressure to open out the envelope.

Our experiments have shown that the use of compressed air is very effective to open out the envelope and we believe that the air acts as a fluid lubricant and we shall therefore refer hereinafter to air lubrication though it is possible that in fact the air in some other way.

To sum up at this stage therefore we have provided a flexible pallet which can be opened out to receive a separator when it is desired to move goods and which will collapse to a very thin collapsed form when the separator is removed. The separator may be attached to a lifting truck as an integral part or as an attached fitment.

The envelope forms a casing for the separator so that the support for the goods will substantially entirely be provided by the separator.

Essentially therefore the invention comprises providing a relatively flat envelope forming a pallet on which goods can be stacked and opening out the envelope preferably by a stream of gas blowing into the envelope so that a separator can be inserted by means of which the goods can be moved. Conveniently after the separator has been fully inserted into the envelope the gas may be shut off so that the envelope collapses on to the separator, the gas being used simply as a lubricant to facilitate entry of the separator into the envelope. Preferably the gas is supplied by a form of blower and the gas stream is preferably introduced into the envelope through the mouth of the envelope for example through the leading edge of the separator member.

In a very convenient construction the separator member may be in the form of a wedge shaped hollow metal blade or spade adapted to be secured to the forks of a fork lift truck. Alternatively we may provide a lift truck with an integrally formed separator member instead of forks so that we would have a spade lift truck instead of a fork lift truck, and from now onwards in the description we shall call the separator member a spade.

The envelope preferably consists of suitable plastics material for example polythene of sufficiently durable gauge for the purpose on hand, formed into an envelope conveniently of standard pallet size 40×48 inch. In a one way entry envelope the envelope is sealed at one end and down each side leaving a mouth to open at one end. At the open end the material is preferably folded back inwards upon itself and is sealed in that position by means of a discontinuous seal so that when the gas is blown into the envelope the folded back loops of material form air pockets which assist in sealing the mouth of the envelope around the spade as it is being inserted into the envelope.

To provide a two-way entry envelope we can form a mouth at each end of the envelope so that the spade can be introduced at either end. In this case some of the gas will or may escape from the end opposite to that at which the spade is introduced but it must be remembered in this connection that the gas is used substantially only as a lubricant to facilitate entry of the spade and blowing up a full inflation of the envelope is neither desirable nor necessary. In the case of a two-way entry envelope we prefer to form the mouth at each end in the asme manner and as described above, and the opposite end will act in the same manner as the end at which the spade is introduced.

To provide for four-way entry of the spade we may use two separate two-way entry envelopes one above the other and displaced by 90° or we may provide a double envelope with three interconnected layers of flexible or other material comprising an upper layer, a middle layer and may have a mouth at the N and S position and the upper envelope may have a mouth at the E and W position, each mouth preferably being formed as described above. Naturally if desired for some special reason a three-way entry envelope may be provided in a similar manner for example by providing a double envelope as described above and sealing it at one position.

A spade for use in the method described above preferably comprises a hollow wedge shaped metal member which is provided along its leading edge with one or more apertures so that the gas fed into the spade can be discharged from the leading edge into the envelope. Conveniently a gas supply pipe can be extended from, e.g., a blower to an entry valve or the like adjacent to the trailing edge of the spade, the blower or other apparatus being positioned for example on a fork lift truck. The spade is provided in its trailing edge with apertures to receive the forks of a fork lift truck so that the spade can be fitted on to the forks in such a way that the apertures are substantially closed to prevent undue leakage. If desired a necessary resilient means such as rubber or like pads may be provided in the apertures and/or on the forks to improve the sealing. As an alternative the apertures may lead to closed pockets in the spade so that leakage of gas around the forks is positively prevented. Means may be provided to fix the spade securely in position on the forks so that when it is desired to withdraw the spade there is no chance of the forks coming out and leaving the spade in position.

It is therefore another feature of the invention to provide a spade as a fitment for a fork lift truck to convert the truck into a spade lift truck adapted for use with envelopes in the mechanical handling system described above.

If desired we may provide a truck with lifting means permanently or semi-permanently incorporated into the lifting means so that as another feature the invention includes a spade lift truck including a hollow lifting spade which is wedge shaped, which has an opening or openings in the leading edge and on inlet opening to admit gas under pressure.

Figure 7:
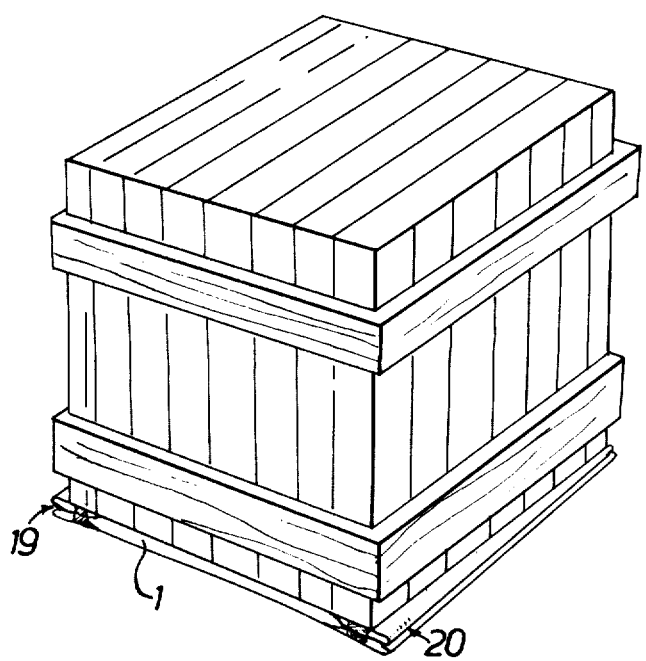
Figure 6:
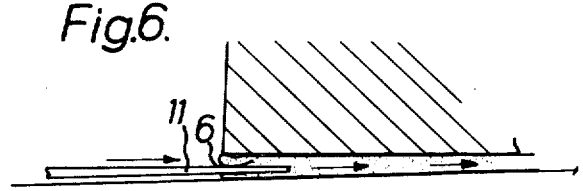

In order that the invention may be more clearly understood and readily carried into effect reference is now directed to the accompanying drawings given by way of example in which:

FIG. 1 is a plan view of an envelope,
FIG. 2 is a section on A—A of FIG. 1,
FIG. 3 is a section on B—B of FIG. 1,
FIG. 4 shows a spade with forks in position, and
FIGS. 5 and 6 are diagrammatic views.
FIG. 7 shows a double entry pallet in accordance with this invention.

Referring first to FIGS. 1, 2 and 3 an envelope 1 of flexible material has sealed side edges 2 and 3, a closed end 4 formed by folding and an open end 5 forming a mouth 6. At the open end 5 the flexible material of which the envelope 1 is formed is folded back inwardly at 7 to form pockets 8, the folded back portions being secured in position by discontinuous sealing lines 9 leaving openings 10 of which two are illustrated at each side but of which there may be more if desired. These openings 10 serve to admit compressed gas to the pockets 8.

It should be noted that normally the envelope lies flat and in FIGS. 2 and 3 the envelope is shown partially blown up for the sake of clarity.

FIG. 4 shows a spade 11 which consists of a hollow wedge shaped member with a leading or narrow edge 12 and a trailing or thick edge 13. A plurality of perforations or openings 14 are provided in the leading edge 12 and/or elsewhere and two openings 15 are provided in the trailing edge to receive as a comfortable fit the forks 16 of a fork lift truck. A stream of gas, e.g., air may be fed into the hollow spade through a feed pipe 17 from a compressor or blower (not shown).

In operation a load is placed upon an envelope as illustrated diagrammatically in FIG. 5 and a spade 11 is brought up to the open mouth 6 of the envelope. The air-stream is then fed into the spade 11 through the feed pipe 17 and is forced through the perforations 14 in the leading edge 12 thus forcing apart the upper and lower layers of flexible material forming the envelope. As the air stream is fed into the mouth 6 the air builds up in the pockets S which therefore inflate and form a seal around the spade 11. With the air supply still operating the spade can now be moved forwards into the envelope substantially without resistance due to the air lubrication because the internal pressure is sufficient to lift the lead slightly to allow easy passage of the spade into the envelope.

When the spade has been fully introduced into the envelope and is in position beneath the load the air supply can be turned off and the flat upper surface of the spade will take the full weight of the load which can be lifted and transported safely in the normal way. When the load has been placed in a desired position the air supply may be turned on again and the pressure raised inside the envelope and air lubrication allows the spade to be removed substantially without any friction.

It will be understood from the above that the use of a plastics material or other flexible envelope transfers super-imposed loading to the floor, ground or other support under the envelope. The envelope may be of any desired size but generally speaking we propose to employ an envelope of the standard 40 × 48 inch size because of the use of the flexible envelope permits the employment of a standard size of envelope for substantially all purposes without loss of floor or other space by turning up unused margins.

FIG. 7 shows a two-way entry inflatable pallet having openings 19 and 20 at opposite edges, thus allowing the separator member to be inserted from either side of the envelope.

In the detailed description given above we have referred mainly, by way of example, to the use of a flexible envelope made of plastics material with special pockets around the mouth or mouths to trap the air. It will be understood that such pockets may also be provided in envelopes including a layer or layers of relatively rigid material R secured to a flexible layer.

In the cases of envelopes with two relatively rigid layers pockets may be provided as above by suitably shaping the flexible connecting means.

It will be understood that the present invention not only provides an extremely sufficient pallet but it also provides a low cost pallet that can if necessary be discarded after being used only once without adding any serious expense to a transport operation. Although we have described the use of a separator member or spade with openings along the loading edge, such openings may, if desired, be supplemented or have been replaced by openings elsewhere in the separator member or spade. We have also described particularly by way of example, the use of a metal spade or separator member but of course a spade for use in the present invention may be made of any suitable sufficiently strong and rigid material, for example, asuitable plastics material or a plastics material strengthened by glass fibers or in other ways.

The invention may be used for lifting a wide variety of loads but the invention is designed particularly for use in container loading. In this connection it will be understood that bulk containers are used on an increasing scale for the movement of a wide variety of goods including goods in sacks, cartons and the like and while in certain figures of the drawings we have shown a load as apparently consisting of a single item the drawings are intended to be purely diagrammatical in respect of the load which more generally will consist of a number of individual sacks or cartons.

What we claim is:

1. Apparatus for mechanically handling goods comprising a pallet having an inflatable chamber defined by a top layer upon which said goods can be placed and a bottom layer, means defining an elongated chamber opening extending along a portion of one edge of said pallet through which a separator member can be inserted into said chamber between said layers to support said goods on said top layer during the handling thereof, inflatable seal means surrounding said elongated opening for substantially sealing said opening about said member when said member is inserted therein and said seal means is inflated, said seal means being in communication with said chamber so that said seal means is inflated when said chamber is inflated, said pallet normally being substantially flat but being inflatable to receive said separator member.

2. The apparatus of claim 1 wherein said seal means comprises at least one pocket having a pocket opening facing substantially away from said chamber opening.

3. Apparatus according to claim 1 wherein said seal means comprises a portion of said pallet surrounding said chamber opening folded back inwardly upon itself.

4. Apparatus according to claim 1 wherein said pallet is constructed substantially entirely of flexible material.

5. Apparatus according to claim 1 wherein a two-way entry pallet is constructed by further providing a second chamber opening in said pallet spaced from said first chamber opening and a second inflatable seal means surrounding said second chamber opening.

6. Apparatus according to claim 1 further comprising a separator member insertable through said chamber opening, said separator member having a leading edge and at least one pressure fluid aperture through which pressure fluid can be supplied to said chamber to inflate said pallet.

7. Apparatus according to claim 6 wherein said aperture is in said leading edge.

8. Apparatus according to claim 6 wherein said separator member comprises a hollow, wedge-shaped blade adapted to be secured to the forks of a fork-lift truck.

9. Appartus according to claim 6 wherein said separator member is provided in its trailing edge with openings adapted to receive the forks of a fork-lift truck.

* * * * *